Feb. 22, 1966   L. R. DURRETT ETAL   3,236,603
MULTIPLE-COLUMN GAS CHROMATOGRAPHIC APPARATUS
Filed Sept. 28, 1962   2 Sheets-Sheet 1
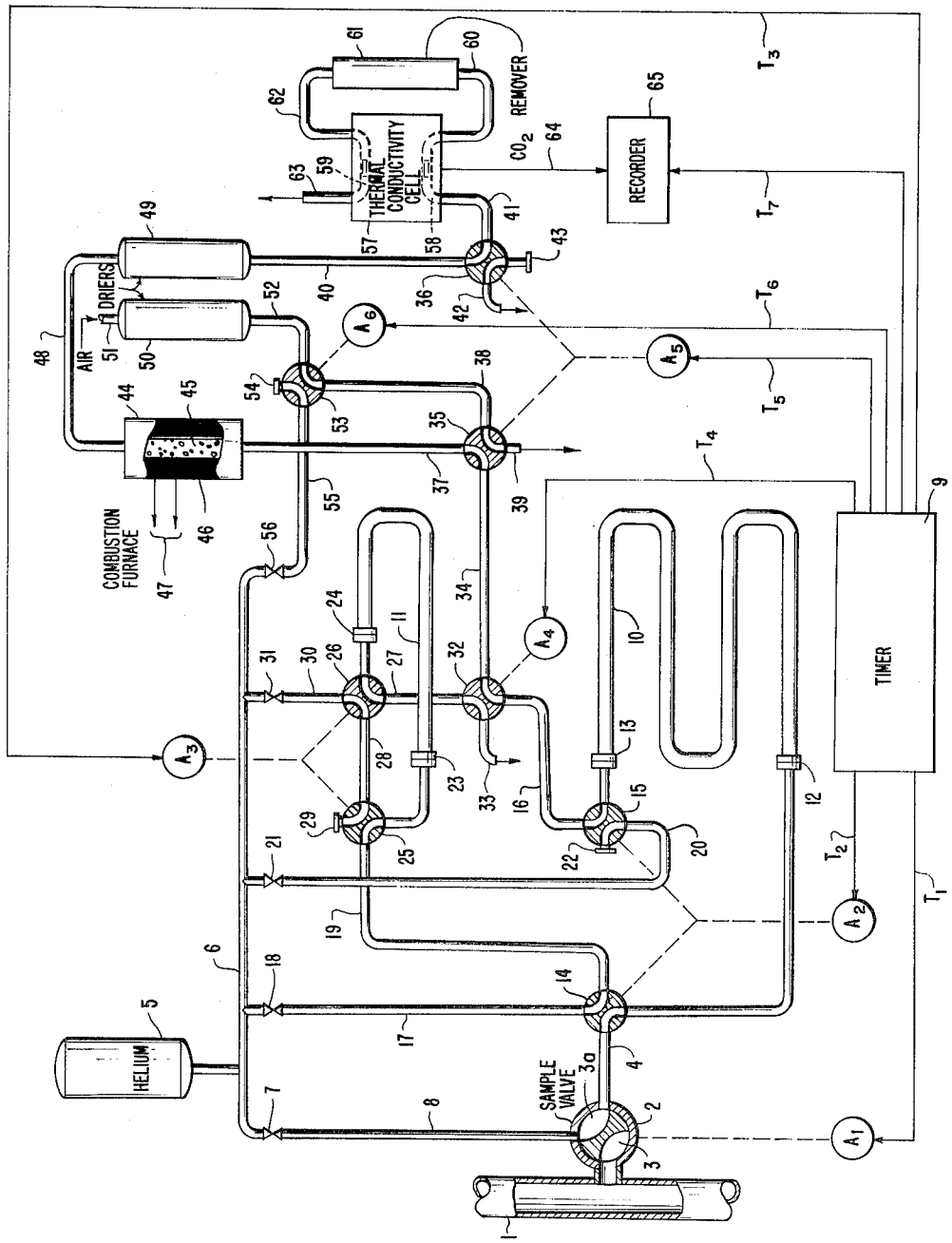
FIG. I
INVENTORS:
LARRY R. DURRETT
MILBURN J. O'NEAL, JR.
BY: Oswald H. Milmore
THEIR ATTORNEY

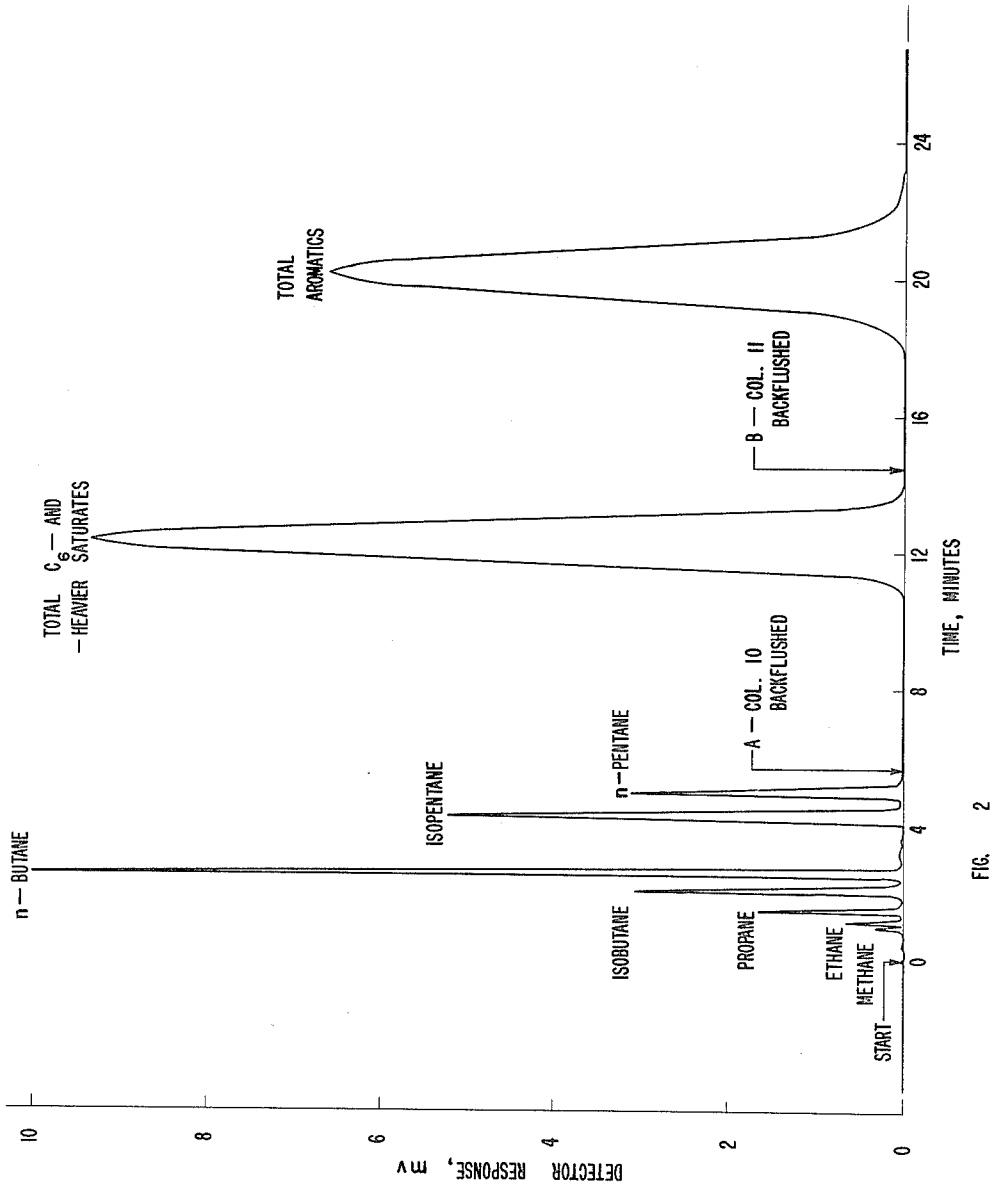

United States Patent Office 3,236,603
Patented Feb. 22, 1966

3,236,603
MULTIPLE-COLUMN GAS CHROMATOGRAPHIC
APPARATUS
Larry R. Durrett and Milburn J. O'Neal, Jr., Pasadena,
Tex., assignors to Shell Oil Company, New York, N.Y.,
a corporation of Delaware
Filed Sept. 28, 1962, Ser. No. 226,824
4 Claims. (Cl. 23—254)

The invention relates to apparatus for analyzing mixtures by gas chromatography and is, more particularly, concerned with apparatus comprising a plurality of columns which are brought into operation in succession to segregate said mixtures into several components or groups of components. Although the specific analysis described herein employs gas-liquid partition chromatography, the invention is not limited to gas-liquid partition chromatography and may be utilized in gas-solid adsorption chromatography or a combination of gas-liquid and gas-solid chromatography as well.

In using gas-liquid partition chromatography to separate the constituents of a mixture, a sample of the latter is carried by a carrier gas such as helium through an elongated passage—called a column—which contains an essentially non-volatile stationary liquid on the passage walls or supported by small solids. Different constituents of the sample are retained in the liquid in accordance with their respective partition coefficients, which depend upon the nature of the solute and the stationary liquid and also on the operating temperature. The action is such that the constituents—usually the heaviest or highest boiling—having the greatest tendency toward retention are retained at the inlet and the others in successive zones toward the outlet end. This retention being temporary, the carrier gas, which continues to flow after introduction of the sample, carries them out of the column sequentially, one by one in the ideal case, the constituents which were retained nearest the inlet end being the last to be eluted. The effluent steam is passed through a detecting device, such as a thermal conductivity cell, a gas-density balance, an infrared analyzer, hydrogen flame ionization detector, or any of a number of other known devices, wherein successively emerging constituents are detected, generally quantitatively. The output signal from the detector is, in most instances, recorded on a recorder, usually of the potentiometric type. In some instances, the flow of carrier gas is discontinued before the most tenaciously held constituents are eluted; these may be later removed from the column by a technique known as backflushing.

Known gas chromatographic apparatus are not suitable for certain analyses in which it is desired to effect several different types of separations in a single analysis cycle. For example, it is often desirable to effect separations among different types of constituents, each having characteristics which necessitate a different type of stationary liquid phase. In known apparatus suitable for automatic operation, it has been necessary to flow the total sample through the same column or series of columns and the use of columns containing different liquid phases for effecting type as well as volatility separations has been possible only after a preliminary fractionation of the sample.

By way of specific example, when a sample consisting of hydrogen and $C_1$-$C_{11}$ saturated hydrocarbons and $C_6$-$C_{11}$ aromatic hydrocarbons is analyzed and it is desired to report individual low-boiling saturates, e.g. through $C_5$, all $C_6$-and-heavier saturates in a group, and all aromatics in another group, using an essentially non-polar liquid, an excessively long time would be required to elute the higher-boiling saturates and aromatics if the column was operated at a temperature sufficiently low to resolve the light saturates. The excessive elution times could be avoided by increasing the column temperature during the analysis cycle; however, it is impossible to separate the saturates from the aromatics over the entire boiling range of the sample. If a very polar liquid is used as the stationary phase, the saturates can be resolved from the aromatics, but with such a liquid the low-boiling saturates would not be resolved, one from another.

Moreover, it is often desirable to perform fully automatic analyses using a series of gas chromatographic columns within limited time periods, such as 5–30 minutes, and to report a subgroup of a large group of heavy constituents which would be eluted from the column of a time longer than said limited time period. This has not been feasible with known apparatus.

It is the general object of the invention to provide an improved multi-column gas chromatographic apparatus suitable for effecting different types of separations in a single analysis cycle, wherein excessively long residence times in the columns are avoided.

A further object is to provide an automatic multi-column gas chromatographic apparatus which can analyze a multi-component mixture by making a succession of analyses using a plurality of columns. Ancillary thereto, it is an object to provide apparatus of the type indicated using an oxidizing agent wherein the oxidizing agent is automatically regenerated in timed relation to the analyses.

A specific object is to provide a multi-column gas chromatographic apparatus suitable for making separations between and giving separate quantitative measure of the presence of a plurality of low boiling saturated hydrocarbons individually, e.g., $C_1$-$C_5$, a composite quantitative measure of the higher saturated hydrocarbons, and a composite quantitative measure of the aromatics hydrocarbons.

Further objects will become apparent from the following specification.

In summary, according to the invention there are provided a plurality, e.g., two, partition columns which may contain different stationary liquid phases, a device for detecting the presence of and quantitatively measuring successive constituents in a gas stream passed therethrough, means, such as a sampling valve, for flowing a carrier gas containing a predetermined quantity of sample forward through the first column and transferring the eluted constituents and carrier gas through the detector, valve and conduit means for flowing carrier gas in the reverse direction through the first column and, together with constituents removed therefrom, forward through the second column and thence to said detector; there are further provided additional valve and conduit means for flowing carrier gas in the reverse direction through the second column and, together with constituents removed therefrom, to the detector, either directly or after flowing through a third column, which may be similarly provided with backflushing means to the detector.

The several valve means can be operated manually or automatically, e.g., by a timing device, to cause the carrier gas to flow in the various directions in the above-mentioned order.

The detector may be of any known or suitable type, e.g., a thermal conductivity cell, a gas-density balance, an infrared analyzer, or a hydrogen flame ionization detector to mention a few of the more commonly used devices. When the sample contains a significant proportion of hydrogen, it is desirable to include an oxidizer, e.g., a heated section of tubing containing a metal oxide, preferably copper oxide, for converting hydrogen to water and hydrocarbons, to water and carbon dioxide, and a drying agent for removing the water. This arrangement offers several attractive advantages. Firstly if the hydrogen was not converted to water and removed, an additional stage containing a gas-solid adsorption chromatographic column would be necessary in order to resolve hydrogen and methane. Secondly, since the hydrocarbons are measured as carbon dioxide, the need for relative detector response corrections for the various hydrocarbons is eliminated. Obviously, if the oxidizer is included, the detector must respond to carbon dioxide.

The invention further includes, as an optional feature, means for regenerating the oxidizer at any desired time interval. To this end, there may be provided a source of dry air and valve means, controlled by a timer, for flowing air through said oxidizer.

The invention will be further described with reference to the accompanying drawing showing one preferred embodiment by way of illustration, wherein:

FIGURE 1 is a diagrammatic view of the apparatus and the control elements, and

FIGURE 2 is a chromatogram showing one possible output from the apparatus.

Referring to FIGURE 1, 1 is a sample source, such as a pipe containing a stream to be analyzed and fitted with a sample valve 2 having a first valve actuator $A_1$ mechanically coupled thereto. The sample valve may be of any type, being diagrammatically represented as a rotor with pockets 3 and 3a, to feed a sample having a predetermined volume into the system each time it is rotated through 180°. This sample is carried into a duct 4 by a carrier gas, e.g., helium, supplied from a source 5 through a manifold 6, regulator 7 and pipe 8. The actuator $A_1$ is of any suitable type, e.g., electrical or pneumatic, which can rotate the sample valve rotor through 180° each time a signal is transmitted via a control line $T_1$ from a timer 9.

The first and second partition columns are represented at 10 and 11, respectively, and these may be of different lengths and contain stationary liquids of different types and amounts. Adsorption columns could also be used if the desired separation so dictates. In the example to be described the column 10 may contain an essentially non-polar liquid. By way of a specific example, it may be tubing 15-feet in length and 0.12-inch in internal diameter containing 16.7% by weight of General Electric SF–96 silicone on 40–60 mesh firebrick; however, other liquids, such as squalane or paraffin oil, may be used as the liquid. The column 11 may, in this example, contain a liquid which preferentially retains aromatics relative to saturates. In a specific example, it may be tubing 10-feet in length and 0.12-inch in internal diameter, containing 40% by weight of $\beta, \beta'$-thiodipropionitrile on 40–60 mesh firebrick; however, other liquids, such as polyethylene glycols, may be substituted. These columns are normally temperature-controlled, e.g., by installing same in constant-temperature ovens, not shown. In the example the columns 10 and 11 may be held at 50° C. and 85° C., respectively. The carrier gas flow rates may be 75 ml./min. in the example cited.

The inlet and outlet ends 12 and 13, respectively, of the column 10 are connected to a valve mechanism providing two four-way valves 14 and 15 having a common actuator $A_2$ which is controlled by a control line $T_2$. In the normal position shown the valves connect the duct 4 to the inlet 12 and the outlet 13 to a pipe 16; they further connect a pipe 17, having a regulator 18 and connected to receive carrier gas from the manifold 6, to a pipe 19; and connect a pipe 20, having a regulator 21 and connected to receive carrier gas from the manifold 6, to a blind 22. When valves 14 and 15 are rotated through 90° from the positions shown they interconnect: duct 4 to the pipe 17; inlet 12 to the pipe 19; outlet 13 to the pipe 20; and pipe 16 to the blind 22.

The inlet and outlet ends 23 and 24, respectively, of the column 11 are connected to a valve mechanism providing two four-way valves 25 and 26 having a common actuator $A_3$ which is controlled by a control line $T_3$. In the normal positions shown the valves connect the pipe 19 to the inlet 23, and the outlet 24 to a pipe 27; they further connect a pipe 28 to a blind 29 and to a pipe 30 having a regulator 31 and connected to receive carrier gas from the manifold 6. When the valves 25 and 26 are rotated through 90° from the positions shown they interconnect: pipe 19 to the blind 29; inlet 23 to the pipe 27 via pipe 28; and outlet 24 to the pipe 30.

Another four-way valve 32 is provided which, in its normal position shown, interconnects the pipe 27 to a vent 33, and the pipe 16 to a pipe 34. This valve may be provided with a separate actuator $A_4$, controlled by a control line $T_4$, but may, if desired, be actuated by the actuator $A_2$ simultaneously with the valves 14 and 15. When valve 32 is rotated through 90° from the position shown it interconnects the pipe 16 to the vent 33 and the pipe 27 to the pipe 34.

A valve mechanism providing two four-way valves 35 and 36 has a common actuator $A_5$ controlled by a control line $T_5$. In their normal positions shown these valves interconnect: the pipe 34 to a pipe 37; a pipe 38 to a vent 39; a pipe 40 to a pipe 41; and a vent 42 to a blind 43. When rotated through 90° from normal position these valves interconnect: the pipe 34 to the vent 39; the pipe 37 to the pipe 38; the pipe 40 to the vent 42; and the pipe 41 to the blind 43.

The pipe 37 is connected to the inlet side of a combustion furnace 44 of any type suitable to convert hydrogen and hydrocarbons into water and carbon dioxide. For example, it may include a chamber filled with metal oxide 45, e.g., copper oxide, and a heating coil 46 to which electric power is supplied by a circuit 47. This circuit may be controlled by a thermostat, not shown, to maintain a desired temperature, such as 750–800° C. The outlet side of the furnace is connected by a pipe 48 to a drier 49, such as a cartridge containing a desiccant, e.g., calcium sulfate or magnesium perchlorate. The drier discharges moisture-free gas to the pipe 40.

A second drier 50, which may be of the same type, has an air inlet 51 by which air is supplied under pressure from a source, not shown. It discharges dry air to a pipe 52 which is connected to a four-way valve 53 having an actuator $A_6$ controlled by a control line $T_6$. In its normal position shown the valve 53 interconnects the pipe 52 to the pipe 38, and a blind 54 to a pipe 55 having a regulator 56 and connected to receive carrier gas from the manifold 6. When the valve 53 is rotated through 90° from the position shown it interconnects pipe 52 to the blind 54 and the pipe 38 to the pipe 55.

The pipe 41 is connected to a suitable measuring instrument, such as a dual-pass thermal conductivity cell 57 containing first and second flow channels 58 and 59 and elements for measuring the difference in the thermal conductivities of gasses passing through these channels. These measuring elements being known per se, they are not further described herein. The gas from the pipe 41 flows through the channel 58 and thence, via a pipe 60, to a carbon dioxide remover 61, such as a column packed with sodium hydroxide on asbestos, known as "ascarite." The gas from which carbon dioxide has been removed is then conducted via a pipe 62 to the channel 59 and is discharged through a vent 63. The signal from the cell 57 is transmitted by a circuit 64 to a recorder or digitizer 65 for recording the measured conductivities at successive time. Time signals are transmitted to the recorder or digitizer by a control line $T_7$. Various chart recorders and digitizers are known and the device 65 is not, therefore, further described in detail.

The timer 9 is of the type that emits control signals through the lines $T_1$ through $T_7$ in the sequence described hereinafter. These signals may be pneumatic, electrical or mechanical, depending upon the nature of the actuators. In one suitable embodiment each signal causes the actuator to advance the corresponding valve or valves through an arc of 90°, except that actuator $A_1$ causes the sample valve to turn 180°.

Operation is as follows: the valves being all in their normal positions shown, the regulators 7, 18, 21, 31 and 56 controlling the flow of carrier gas, and the combustion furnace being heated and filled with metal oxide, a source stream to be analyzed being passed through the pipe 1, the stream continually flushes the pocket 3 of the sample valve, so that the contents thereof corresponds in composition to the sample stream.

Carrier gas from the source 5 flows through the pipe 8 and thence through the sample valve pocket 3a, the partition column 10, furnace 44, drier 49, cell 57 and vent 63. The compositions in the channels 58 and 59 being alike—both pure carrier gas—the output through the circuit 64 is initially zero. During the preliminary period the instrument can be adjusted, e.g., by balancing its Wheatstone bridge.

To start an analysis the timer is started. It first emits simultaneous signals through lines $T_1$ and $T_7$; the former causes the sample contained in pocket 3 to move to the position shown for pocket 3a and the sample is carried by the gas into the inlet 12 of column 10 via pipe 4 and forwards through the column, and the latter signal starts the recording chart or digitizer to indicate zero time. The constituents of the sample are partitioned in the column and the lighter ones are eluted by the carrier gas and are carried from the outlet 13 through the furnace 44, wherein conversion of oxidizable constituents to water and carbon dioxide is effected. The water is removed in the drier 49 and only carrier gas and carbon dioxide flow through the cell 57. Whenever carbon dioxide formed by oxidation of one of the lighter constituents reaches the channel 58 a signal is emitted via the circuit 64 and recorded. This flow continues during a predetermined time period sufficient to elute those constituents which are to be separated in the first column. During this period carrier gas also flows from pipe 17 via pipe 19 through the second column 11 and thence to the vent 33 via the pipe 27.

At the end of the first time period signals are emitted through lines $T_2$ and $T_4$; these may be simultaneous or, if desired, the signal $T_4$ may be slightly later. The flow of carrier gas through the pipes 8 and 17 now ceases, and carrier from the pipe 20 flows in the reverse direction through the first column 10 to carry out of its inlet end 12 constituents which were retained in this column. The stream flows thence through the pipe 19 to the inlet 23 of the second column 11 and, from its outlet 24, via the pipes 27, 34, and 37 through the furnace and other elements as previously described. The column 11 effects a separation, and may be operated so that only one or a group of constituents is eluted and other constituents are retained. The eluted constituents are detected in the cell 57 and recorded. The flow continues for a second time period sufficient to elute the desired constituents from the column 11.

At the end of the second time period a signal is emitted through the line $T_3$. This stops the flow from the pipe 20 because the pipe 19 is thereby terminated in the blind 29. Instead, carrier gas from the pipe 30 now flows into the outlet end 24 of the column 11 and through this column in reverse direction to backflush noneluted constituents. The stream flows thence from the inlet end 23 through the pipes 28 and 27 to the valve 32 and thence through the pipes 34 and 37 as previously described. The back-flushed constituents are detected in the cell 57 and recorded. This flow continues for a third time period sufficient to carry the carbon dioxide due to the retained constituents through the cell 57.

At the end of the third period a signal is emitted through the lines $T_4$ and $T_5$. This diverts the flow of carrier gas from the pipe 27 to the vent 33 and admits dry regeneration air from the drier 50 through pipes 52, 38 and 37 to the furnace 44 to regenerate the copper oxide 45. The regeneration air flows through the drier 49, and thence through the pipe 40 to the vent 42. This continues throughout the regeneration period, e.g., three to ten minutes. At the start of the regeneration period a signal may also be transmitted via the line $T_7$ to signal an end-of-test condition and stop the recorder.

Following the regeneration period a signal is emitted via line $T_6$. This causes carrier gas from the pipe 55 to flow through the pipes 38 and 37 through the furnace and drier 49 and thence out through the vent 42 to flush out air. It also connects the pipe 52 to the blind 54 to stop the flow of regeneration air.

At the end of the flushing period described in the preceding paragraph, signals are transmitted simultaneously or sequentially to the lines $T_2$, $T_3$, $T_5$ and $T_6$ to restore these valves to their normal positions, it being desirable to operate the last two valves rapidly or in the sequence given to prevent influx of regeneration air into the system. The device is now ready to perform another analysis.

Incomplete combustion of the hydrocarbons and/or saturation of the carbon dioxide remover 61 is detected readily by the occurrence of a negative peak in the output through circuit 64.

It is evident that back-flushing of the second column 11 is not necessary in every application of the invention, as when it is desirable that all constituents of the feed mixture be eluted through its outlet end.

EXAMPLE I

The apparatus described above was used to analyze a stream containing over 90% hydrogen, the balance consisting of $C_1$–$C_{11}$ saturated hydrocarbons and $C_6$–$C_{11}$ aromatic hydrocarbons. It was desired to record separately the individual $C_1$–$C_5$ saturates, the total $C_6$-and-higher saturates, and the total aromatics. The device was operated as described above. In these analyses the saturates below $C_6$ were eluted from the outlet end of the column 10; the other hydrocarbons were backflushed into the column 11 from which the $C_6$-and-higher saturates were eluted from the outlet end and the aromatics backflushed from the inlet end. The fact that the stationary liquid in the second column, $\beta,\beta'$-thiodipropionitrile, has very little affinity for saturated hydrocarbons made it possible to elute all saturates as a group. The results of three successive analyses were as is given in Table I:

*Table I*

| Components | Percent by Weight of Hydrocarbons | | |
|---|---|---|---|
| | Analysis 1 | Analysis 2 | Analysis 3 |
| Methane | 4.9 | 4.8 | 4.7 |
| Ethane | 7.3 | 7.3 | 7.3 |
| Propane | 11.5 | 11.6 | 11.6 |
| Isobutane | 4.4 | 4.4 | 4.5 |
| n-Butane | 5.7 | 5.7 | 5.7 |
| Isopentane | 3.5 | 3.5 | 3.5 |
| n-Pentane | 2.3 | 2.4 | 2.4 |
| Total $C_6$-and-Heavier Saturates | 8.4 | 8.4 | 8.3 |
| Total Aromatics | 52.0 | 51.9 | 52.0 |

The data show a high degree of repeatability.

EXAMPLE II

The accuracy of the apparatus is indicated in Table II which shows two analyses performed on a synthetic $C_6$–$C_{11}$ liquid sample of known composition.

*Table II*

| Component | Percent by Weight of Hydrocarbons | | |
|---|---|---|---|
| | Known | Analysis 1 | Analysis 2 |
| Saturates | 45.7 | 45.3 | 45.6 |
| Aromatics | 54.3 | 54.7 | 54.4 |

EXAMPLE III

The effluent from an experimental catalytic reformer pilot plant containing over 90% hydrogen was analyzed as described in Example I. The chromatogram produced by the recorder 65 is shown in FIGURE 2. In this view the abscissa represents time in minutes from the start of the analysis. The point A gives the time at which the valves 14, 15 and 32 were operated to start the reverse flow of helium through the column 10; and the point B gives the time at which the valves 25 and 26 were operated to backflush the column 11. The ordinate gives the voltage in the output circuit 64.

We claim as our invention:

1. A gas chromatographic apparatus which comprises:
   (a) a first partition column having inet and outet ends,
   (b) a second partition column having inlet and outlet ends,
   (c) means to introduce a carrier gas carrying a feed sample to the inlet end of the first column for forward flow therethrough,
   (d) detector means connected to receive the effluent stream from the outlet end of said first column for determining successive constituents flowed through the detector means,
   (e) means for flowing a carrier gas through said first column in reverse direction to carry off constituents retained therein and for flowing the resulting mixture into the inlet end of said second column for forward flow therethrough,
   (f) means for flowing the effluent stream from the outlet end of said second column to said detector means, and
   (g) means for backflushing said second column, including means for flowing a carrier gas through said second column in reverse direction to carry off constituents retained therein and for flowing the resulting mixture stream to said detector means.

2. In combination with the apparatus defined in claim 1, timing means for controlling operation including:
   (a) means for initiating the reverse flow of carrier gas through the first column a predetermined time period following the forward flow of the feed sample therethrough, and
   (b) means for initiating the reverse flow of carrier gas through the second column a predetermined time period following the flow therethrough of the carrier gas from the first column.

3. A gas chromatographic apparatus for automatically determining constituents in a feed sample which comprises:
   (a) a source of carrier gas,
   (b) a sample valve including a first valve actuator means connected to a sample source and said carrier gas source for normally flowing a stream of carrier gas alone and admitting a feed sample of predetermined size into said stream upon actuation of the valve,
   (c) a first partition column having inlet and outlet ends,
   (d) a second partition column having inlet and outlet ends,
   (e) detector means for determining the presence of successive portions of the sample in a stream passed therethrough,
   (f) valve and conduit means including a second valve actuator means for flowing said stream from the sample valve into the inlet of the first column and, from the outlet thereof, to the detector means when in normal position, and for flowing carrier gas from said source through said first column in reverse direction and out of the inlet end thereof when in another position,
   (g) valve and conduit means including a third valve actuator means for flowing said gas discharged from the inlet end of the first column into the inlet of the second column and, from the outlet thereof, to the detector means when in normal position, and for flowing carrier gas from said source through said second column in reverse direction and out of the inlet end thereof and into the detector means when in another position, and
   (h) timing means for actuating said valve actuator means in succession and at intervals.

4. A gas chromatographic apparatus for automatically determining the content of aliphatic and aromatic hydrocarbons in a source stream which comprises:
   (a) means for periodically abstracting a feed sample from said source stream,
   (b) a first partition column having inlet and outlet ends and containing a stationary liquid phase which is essentially non-polar,
   (c) a second partition column having inlet and outlet ends and containing a stationary liquid phase which is selective for aromatics,
   (d) detector means for determining the presence of successive hydrocarbons in a stream flowed therethrough,
   (e) means for flowing a carrier gas and said feed sample through said first column in a forward direction and flowing the effluent from the outlet end of said first column containing light aliphatic hydrocarbons through said detector means for a predetermined first time period,
   (f) means for flowing a carrier gas through said first column in reverse direction to carry off heavier aliphatic and aromatic hydrocarbons retained therein and flowing the resulting mixture into the inlet end of said second column for forward flow therethrough for a second predetermined time period following said first-time period,
   (g) means for flowing the effluent stream from the outlet end of said second column containing heavier aliphatic hydrocarbons through said detector means during said second-time period, and
   (h) means for flowing a carrier gas through said second column in reverse direction to carry off aromatic hydrocarbons retained therein and flowing the resulting mixture through said detector means for a third predetermined time period subsequent to said second time period.

References Cited by the Examiner

UNITED STATES PATENTS 3,111,835   11/1963   Jenkins.
3,152,470   10/1964   Reinecke et al. _____ 73—23.1

OTHER REFERENCES

Baker et al.: "Control Engineering," pp. 77–81, vol. 8, January 1961.

Simmons et al.: "Anal. Chem." pp. 32, 731, 732 (1960).

MORRIS O. WOLK, *Primary Examiner.*

DELBERT E. GANTZ, *Examiner.*